United States Patent [19]

Basu

[11] Patent Number: 5,144,629
[45] Date of Patent: Sep. 1, 1992

[54] METHOD AND APPARATUS FOR LASER TUNING

[75] Inventor: Santanu Basu, Arlington, Mass.

[73] Assignee: Massachusetts Institute of Technology, Cambridge, Mass.

[21] Appl. No.: 693,551

[22] Filed: Apr. 30, 1991

[51] Int. Cl.[5] .............................................. H01S 3/10
[52] U.S. Cl. ..................................... 372/20; 372/22; 372/70
[58] Field of Search ....................... 372/20, 70, 21, 22, 372/25

[56] References Cited

U.S. PATENT DOCUMENTS 4,914,663  4/1990  Basu et al. ........................... 372/18
5,034,951  7/1991  Edelstein et al. .................... 372/22

OTHER PUBLICATIONS

S. E. Harris et al., "Observation of tunable optical parametric fluorescence" *Physical Review Letters*, vol. 18, No. 18, May 1, 1967, pp. 732-734.
J. E. Pearson et al., "Observations of parametric fluorescence and oscillation in the infrared", *Applied Optics*, Jun. 1973 vol. 12 No. 6 pp. 1165-1171.
S. Basu et al., "64-dB amplification of 19-psec laser-diode pulses in a Ti-sapphire laser", *Optics Letters*, vol. 14, No. 22, Nov. 15, 1989, pp. 1272-1274.

*Primary Examiner*—James W. Davie
*Attorney, Agent, or Firm*—Wolf, Greenfield & Sacks

[57] ABSTRACT

This invention relates to a method and apparatus for tuning a laser amplifier, which amplifier utilizes a laser medium capable of lasing over a selected broad wavelength band. The lasing medium is pumped and a selectively tunable optical parametric generator (OPG), such as an optical parametric amplifier or an optical parametric oscillator, is driven with an optical signal at a wavelength such that the OPG, as tuned, generates an output at a selected wavelength within the broad wavelength band of the lasing medium. The output from the OPG is injected as a seeding input to the lasing medium to adjust the lasing wavelength thereof. All components of the system are preferably solid state components and the OPG is preferably driven from the pumping source so as to assure proper synchronization.

22 Claims, 1 Drawing Sheet

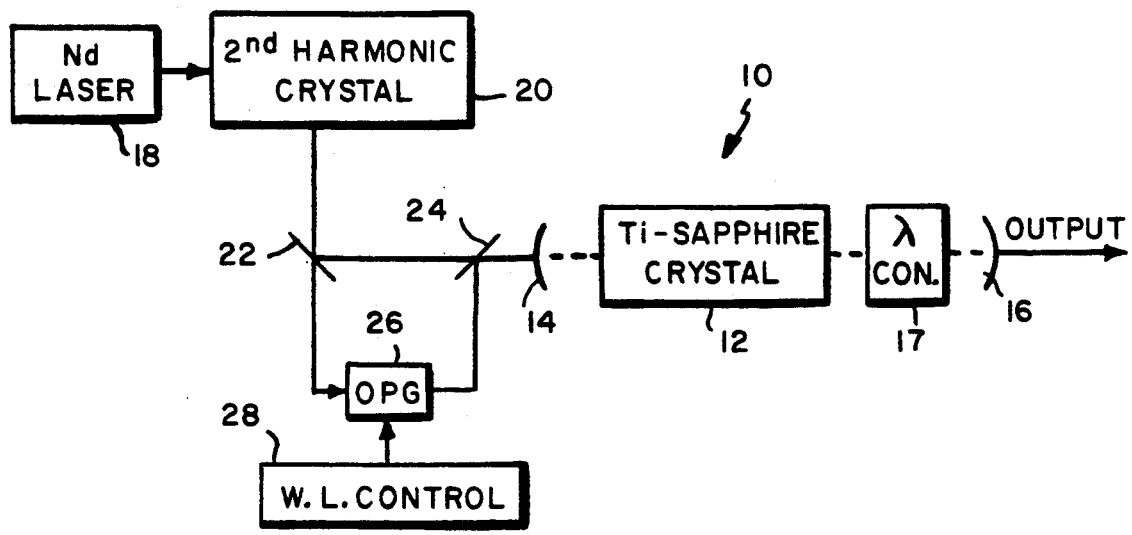
FIG. 1
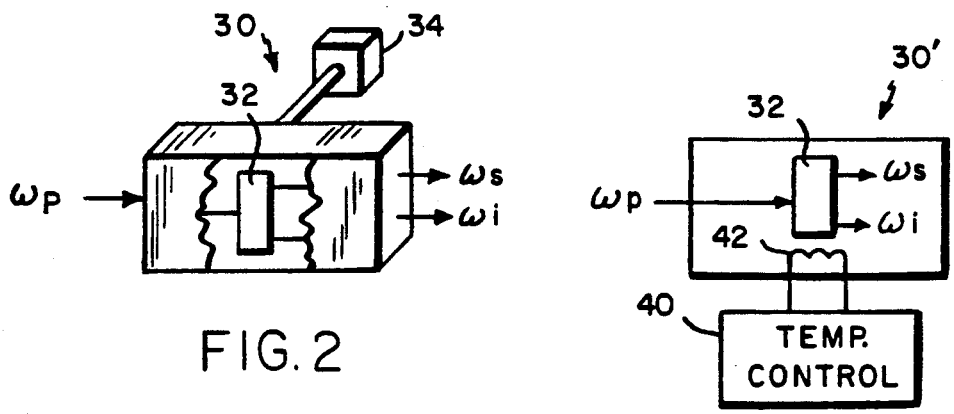
FIG. 2
FIG. 3
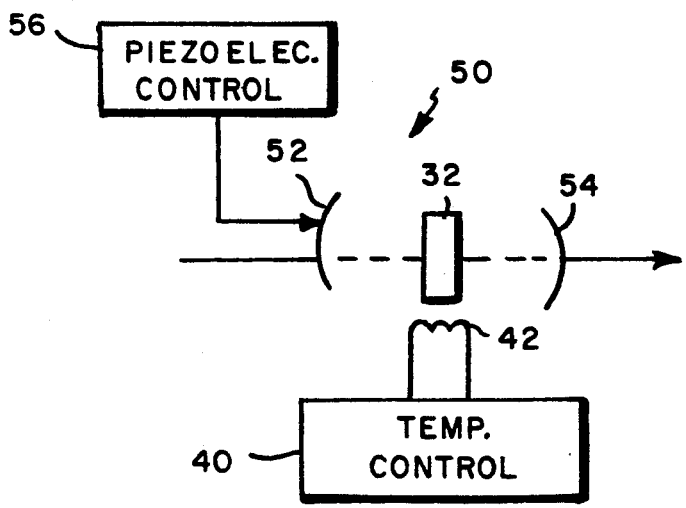
FIG. 4

METHOD AND APPARATUS FOR LASER TUNING

FIELD OF THE INVENTION

This invention relates to laser systems and more particularly to a method and apparatus for tuning a lasing medium, capable of lasing over a relatively broad wavelength band, to operate at a selected wavelength within such band.

BACKGROUND OF THE INVENTION

There are many applications in research and industry where a short pulse of an amplified optical beam is required at a particular frequency or wavelength. One way in which to generate a short pulse at a desired wavelength is to utilize a lasing medium which is adapted to lase over a relatively broad wavelength band, to mode lock the laser and to then tune the laser to generate its output at the desired wavelength. For example, Ti sapphire lasers are adapted to lase over a spectrum or band from 650 to 1050 nm, a wavelength and where few other lasers are available.

However, some difficulties have been experienced in tuning lasers in general, and Ti sapphire lasers in particular, to a desired output wavelength. This has been true when operating in continuous wave mode, and is even more true when operating in pulse mode, particularly narrow pulse mode.

One technique which has been utilized in the past to obtain short tunable pulses from a laser is to apply an optical seeding signal to the laser at the desired frequency and of desired pulse width. A system for operating a Ti sapphire laser in this manner is shown in an article entitled "64-dB amplification of 19-psec laser diode pulses in a Ti-sapphire laser" by Santanu Basu, Paul May and Jean Marc Halbout, Optics Letters, Vol. 14, No. 22, Nov. 15, 1989, Page 1272–1274. The system disclosed in this article utilizes a diode laser operating at the desired frequency to generate the required seeding signal.

While the system shown in the Basu et al article is useful, it has a number of limitations which restrict its utility as a commercial product. First, it may be difficult to find a diode laser operating in the desired wavelength band and second, the tuning range utilizing such a diode laser may be limited. In addition, the diode laser needs to be mode matched and synchronized with the laser it is seeding in order for the desired laser frequency control to be achieved. Such synchronization is not easily achievable, making this system difficult to use. Finally, energy available in a short pulse from a diode laser for generating the seeding signal is usually so small as to make the seeding function difficult.

Other techniques for generating short pulses from tunable lasers have involved similar problems of achieving tunability over a broad band, achieving synchronization, etc., and some schemes have also involved the use of relatively large and expensive Argon ion lasers (see, for example, "Amplification of Femtosecond Pulses in Ti:Al/sub 2/0/sub 3/ Using an Injection Seeded Laser", Dept. of Electr. Eng., MIT, Cambridge, MA 15, Dec. 1989, LaGasse, M.J., et al).

A need, therefore, exists for an improved method and apparatus for tuning Ti sapphire and other lasers adapted to generate outputs over a broad wavelength band, which method and apparatus affords relatively easy tunability over the entire wavelength band of the laser, which provide inherent stability and synchronization between the laser and any seeding signal and which utilize only relatively small and relatively low power solid state components.

SUMMARY OF THE INVENTION

In accordance with the above, this invention provides a tunable laser amplifier utilizing a laser medium mounted in a laser cavity, the laser medium being capable of lasing over a selected broad wavelength band. For example, where the lasing medium is Ti sapphire, the wavelength band is from 650 to 1050 nanometers. The lasing medium is pumped and a selectively tunable optical parametric generator (OPG), such as an optical parametric amplifier or an optical parametric oscillator, is provided. The OPG is driven with an optical signal at a wavelength such that the OPG, as tuned, generates an output at a selected wavelength within the selected broad wavelength band of the lasing medium. The output from the OPG is injected as a seeding input to the lasing medium to adjust the lasing wavelength thereof.

The system is preferably an all solid state system with a crystal lasing medium, a crystal laser as a pumping source and a crystal OPG which is preferably also driven from the same source as is used for pumping. This use of a common source for both pumping and driving the seeding signal generating OPG assures proper synchronization between the pump and seed signals.

For various embodiments, the OPG is an angle tuned optical parametric amplifier having a nonlinear crystal oriented at a selected angle; a temperature tuned optical parametric amplifier, or an optical parametric oscillator having a nonlinear crystal mounted at a selected angle in a mirror cavity which may have its output wavelength adjusted by adjusting one or both of nonlinear crystal angle and temperature of the optical parametric oscillator. The cavity lengths of the OPO and the tunable laser may have to be matched.

The pumping input, and the laser output, may be continuous wave, or may be pulsed. The OPG may also generate a narrow pulse width pulsed output.

The foregoing and other objects, features and advantages of the invention will be apparent from the following more particular description of preferred embodiments of the invention as illustrated in the accompanying drawings.

IN THE DRAWINGS

FIG. 1 is a schematic block diagram of a laser system incorporating the teachings of this invention.

FIG. 2 is a block representation of an angle-tuned optical parametric amplifier suitable for use as the optical parametric generator shown in FIG. 1.

FIG. 3 is a schematic block representation of a temperature tuned optical parametric amplifier suitable for use as the optical parametric generator of FIG. 1.

FIG. 4 is a schematic block representation of a tunable optical parametric oscillator suitable for use as the optical parametric generator in FIG. 1.

DETAILED DESCRIPTION

Referring first to FIG. 1, a Ti-sapphire laser 10 is shown which consists of a Ti-sapphire crystal 12 mounted in a mirror cavity between an input mirror 14 and an output mirror 16. An optical wavelength control element 17 may optionally be positioned in the laser cavity. Laser 10 is of standard design and the details of this laser do not form part of the present invention. One advantage of a Ti-sapphire laser is that it may be tuned over a relatively broad wavelength band extending from 650 nanometers to 1050 nm.

The optical pumping signal for laser 10 is obtained from a Neodymium laser 18 or other suitable optical energy source. It is preferable that the optical source 18 be a solid state or crystal laser since this permits a compact system and may permit the device of this invention to be protable. Since the wavelength of Nd laser 18 is substantially higher than the wavelength desired for pumping laser 10, the output from laser 18 is passed through a second harmonic crystal 20 to obtain an output signal which is at a wavelength of approximately 525 nm. The 525 nm output beam from second harmonic crystal 20 is incident on a beam splitter 22 with a portion of the optical beam at beam spliter 22 being applied through beam splitter 24 and mirror 14 which are transparent to the beam from beam splitter 22, to serve as the pump input to laser 10.

Beam splitter 22 allows the portion of the 525 nm beam which is not utilized for pumping laser 10 to pump the optical parametric generator (OPG) 26. For purposes of this invention, an optical parametric generator (OPG) will be considered to be either an optical parametric amplifier or an optical parametric oscillator. Either of these devices is capable of receiving an optical beam at a first wavelength $w_p$ and of converting this input into two signals of wavelengths $w_s$ and $w_i$ in accordance with the relationship $$1/w_s = 1/w_p - 1/w_i \qquad (1)$$

In the above equation, $w_p$ is the wavelength of the pump signal being received from beam splitter 22 and $w_s$ is the wavelength of the seed signal outputted from OPG 26 which is injected into laser 10 by being reflected from mirror 24. Mirror 24 should be substantially fully reflective to the seed beam from OPG 26. $w_i$ is the wavelength of an intermediate beam which is also generated within the OPG. A wavelength control 28 is provided for OPG 26 which may be utilized to vary $w_s$ and $w_i$ for a given $w_p$. For example, when $w_p = 525$ nm, two signals of wavelength 850 nm and 1373 nm may be generated by the OPG.

One possible configuration for OPG 26 and control 28 is shown in FIG. 2. In this figure, the OPG is an angle tuned optical parametric amplifier (OPA) 30 having a nonlinear crystal 32 to which the pump beam $w_p$ is applied. Depending on the angle of the crystal 32 relative to the optical beam applied thereto, the wavelength of the two signals at the output from crystal 32 will also vary within the constraints of Equation 1. For purposes of illustration, the angle of OPA 30 is shown in FIG. 2 as being controlled by a precision motor 34 which may be moved in precise small increments to obtain a desired output wavelength.

Nonlinear crystal 32 may, for example, be a beta Barium Borate (BBO) crystal or a Potassium titanyl phosphate (KTP) crystal oriented such that tunable radiation is generated by parametric amplification process. If a BBO crystal is utilized which is pumped or driven by a 10-MW 525 nm beam, the crystal can generate an output of 1 μJ and at a wavelength of approximately 850 nm. The crystal can be tuned to obtain outputs at different wavelengths by changing the angle of the crystal to the incident beam with the output wavelength varying on average by approximately 1 nanometer per 1/100th degree of crystal rotation. This output change in wavelength is relatively linear at 1 nm per 1/100th degree in the area from 800 to 900 nm. The exact crystal angle required to obtain a seeding beam at a desired wavelength can either be determined mathematically utilizing fairly complex mathematics known in the art, or can be determined empirically for a given pump wavelength and OPA. Since for injection seeding, energy in the order of 1 pJ is required, the output from optical parametric amplifer 30 is more than adequate for this purpose.

FIG. 3 illustrates an alternative optical parametric amplifier 30' which is temperature tuned rather than angle tuned. For this amplifier, a temperature control 40 is provided which is utilized to control the temperature in a heating element 42 in OPA 30'. Temperature control 40 may be a special purpose processor or a programmed microcomputer or may be a larger computer which performs a variety of functions in addition to being programmed to perform the temperature control function for OPA 30'. FIG. 3 is primarily for purposes of illustration and conventional temperature controlled OPA's may be utilized which may be heated or cooled by suitable means to obtain desired output wavelength for a given input or pump wavelength.

FIG. 4 is a schematic representation of an optical parametric oscillator (OPO) 50 having a nonlinear crystal 32 positioned in a mirror cavity formed by an input mirror 52 and an output mirror 54. OPO 50 may be tuned in a variety of ways including controlling the angle of crystal 32 to the incident beam and/or by temperature control as discussed in conjunction with FIG. 3. The cavity length of the OPO needs to be matched with the cavity length of the tunable laser for optimum performance. While an OPO such as that shown in FIG. 4 may be utilized in practicing the teachings of this invention, an OPA such as that shown in FIG. 2 or FIG. 3 is preferred since it is easier to synchronize with the pump signal.

While OPA's and an OPO have been schematically shown in FIGS. 2-4, these figures are primarily for purposes of illustration and it is to be understood that conventional OPA's or OPO's could be utilized for performing the required functions. OPA's and OPO's have been extensively described in the literature.

The system shown in the figures and described above offers a number of advantages over existing systems. First, OPG 26, and in particular the various OPAs described above, are tunable over a relatively broad wavelength band. To the extent that the OPG utilized is not tunable over the full wavelength band of laser 10, other techniques such as varying the pump wavelength to the OPG can be utilized to enhance the tuning range. Standard tuning techniques such as varying reflectivity of cavity mirrors 14 and 16 and employing a wavelength selection element 17 such as a diffraction grating in the laser cavity may also be utilized to supplement the tuning by injection seeding described above.

Further, the pulse outputs from OPG 26 can easily be designed to be of subpicosecond duration. The seeding of laser 10 with subpicosecond duration pulses can control the pulse width of laser output pulses to be of similar narrow width.

Since the OPG controls both the tuning of laser 10 and pulse width of its output, these functions do not need to be performed in the laser cavity itself, and the cavity design can thus be optimized for power amplification. This results in a high-power, tunable, short pulse, all solid state laser device which is relatively easy to both synchronize and use and is easily tunable over a relatively broad wavelength band. Laser devices having this combination of capabilities do not currently exist in the art. The laser cavity may also be designed to be very small, permitting outputs to be obtained in the tens of GHz repetition rate. This would be the highest repetition rate currently available in a solid state, short pulse laser source.

Since, as indicated above, the laser cavity may be designed to optimize power when seeding beams in accordance with the teachings of this invention are utilized, the peak power of the laser is generally limited by the power handling capabilities of the Ti-sapphire crystal 12 or other crystal utilized. Since the power in the crystal is equal to the energy passing through the crystal divided by the pulse length of such energy, peak power handling capability of the crystal is typically enhanced by employing chirped pulse amplification (i.e. utilizing longer pulses in the laser and then utilizing pulse compression outside the laser). With chirped pulse amplification, the peak power of a Ti-sapphire laser incorporating the teachings of this invention can be in the petawatt range.

While the invention has been particularly described above with reference to a Ti sapphire laser 10, it is apparent that the teachings of this invention can also be utilized in other tunable laser systems such as crystal lasers using Alexandrite or Forsterite, in various tunable dye lasers, in diode lasers, and in other tunable laser systems. In each instance, the pump source (for example, 18 and 20 for the preferred embodiment) and the OPG 26 utilized would be selected to provide a pump beam and seeding beam of appropriate wavelength for the laser utilized. Thus, a laser other than an Nd laser 18 might be utilized as the pump source or other pump sources known in the art might be utilized in place of a laser. Depending on pump wavelengths required, second harmonic crystal 20 might also be omitted in some applications.

Further, while OPG 26 is shown in FIG. 1 as being driven from the pump source, and this is advantageous in that it facilitates synchronizing of the pump and seed beams, this is not a limitation on the invention. Thus, in applications where the pump wavelength is not suitable for use to drive the OPG, a separate beam source at the appropriate wavelength may be utilized for driving the OPG. Techniques known in the art, including phase locked oscillators, may be utilized to synchronize the pump source and drive source, or the pump signal, and seeding signal in such applications.

Thus, while the invention has been particularly shown and described above with reference to preferred embodiments, the foregoing and other changes in form and detail may be made therein by one skilled in the art without departing from the spirit and scope of the invention.

What is claimed is:
1. A tunable laser system comprising:
a laser medium mounted in a laser cavity, said medium being capable of lasing over a selected wavelength band;
means for pumping said lasing medium;
a selectively tunable optical parametric generator (OPG) ;
means for driving said OPG with an optical signal at a wavelength such that said OPG, as tuned, generates an output at a selected wavelength within the selected wavelength band of said lasing medium; and
means for injecting the output from said OPG as a seeding input to said lasing medium to adjust the lasing wavelength thereof.

2. A system as claimed in claim 1 wherein said lasing medium is a crystal medium, and wherein said means for pumping, OPG and means for driving are all solid state components.

3. A system as claimed in claim 1 wherein said means for pumping includes a crystal laser.

4. A system as claimed in claim 3 wherein said means for pumping includes an Nd laser; and
wherein said means for pumping includes means for modifying the wavelength of the Nd laser output.

5. A system as claimed in claim 3 wherein said means for driving is connected to receive an input from said means for pumping.

6. A system as claimed in claim 5 including a beam splitter,, and means for applying the output from said means for pumping to said beam splitter, the beam splitter applying part of the output applied thereto to pump said lasing medium and part of said output to drive said OPG.

7. A system as claimed in claim I wherein said OPG is an angle-tuned optical parametric amplifier (OPA) having a nonlinear crystal oriented at a selected angle, and means for adjusting the crystal orientation angle to achieve the selected output wavelength.

8. A system as claimed in claim 7 wherein said nonlinear crystal is a beta Barium Borate crystal.

9. A system as claimed in claim 7 wherein said nonlinear crystal is a Potassium titanyl phosphate crystal.

10. A system as claimed in claim 1 wherein said OPG is a temperature tuned optical parametric amplifier (OPA), and including means for adjusting the OPA temperature to achieve the selected output wavelength.

11. A system as claimed in claim 1 wherein said OPG is an optical parametric oscillator (OPO) having a nonlinear crystal mounted at a selected angle in a mirror cavity; and including means for adjusting one or more of the nonlinear crystal angle and OPO temperature to achieve the selected output wavelength.

12. A system as claimed in claim 1 wherein said means for pumping is a continuous wave source, said lasing medium when pumped from said continuous wave source generating a continuous wave output.

13. A system as claimed in claim 1 wherein said means for pumping is a pulse source, said lasing medium when pumped from said pulse source generating a pulse output.

14. A system as claimed in claim 13 wherein the OPG output is a narrow pulse width pulse output.

15. A laser system tunable to operate at a selected wavelength comprising:
a Ti-sapphire laser tunable over a broad wavelength in the band from 650 to 1050 nm;
a crystal laser;
means for applying the output from said crystal laser to pump said Ti-sapphire laser;
a tunable optical parametric amplifier (OPA);
means for selectively tuning said OPA;
means for driving said OPA with an optical signal at a wavelength such that said OPA, as tuned, generates an output at a selected wavelength within, said band; and means for injecting the output from said OPA as a seeding input to said Ti sapphire laser to adjust the lasing wavelength thereof.

16. A system as claimed in claim 15 wherein said crystal laser is a Neodymium laser having an output at a wavelength of approximately 1050 nm, and including a second harmonic crystal having an output of approximately 525 nm, the output from said crystal being applied to pump said Ti sapphire laser.

17. A system as claimed in claim 16 including a beam splitter, means for applying the output from said second harmonic crystal to said beam splitter, means for applying a first output from said beam splitter to pump said Ti-sapphire laser, and means for applying a second output from said beam litter to drive said OPA.

18. A method for tuning a laser which is capable of lasing over a selected broad wavelength band comprising the steps of:
   pumping said laser with a pump beam at a first selected wavelength;
   injecting the output from an optical parametric generator (OPG) as a seeding input to said laser;
   driving said OPG with an optical beam at a second selected wavelength; and
   tuning said OPG so that it generates an output optical beam at a predetermined wavelength within said wavelength band when driven by the beam at said second selected wavelength.

19. A method as claimed in claim 18 wherein said driving step includes the step of utilizing said pump beam to drive said OPG.

20. A method as claimed in claim 19 wherein said first selected wavelength and said second selected wavelength are the same.

21. A method as claimed in claim 18 wherein said OPG is an angle tuned optical parametric amplifier having a nonlinear crystal oriented at a selected angle, and wherein said tuning step includes the step of adjusting the crystal orientation angle to achieve an output beam at the predetermined wavelength.

22. A method as claimed in claim 18 wherein said OPG is a temperature tuned optical parametric amplifier (OPA), and wherein said tuning step includes the step of adjusting the temperature of said OPA to achieve an output beam at the predetermined wavelength.

* * * * *